(12) United States Patent
Guenthner et al.

(10) Patent No.: US 8,856,759 B2
(45) Date of Patent: Oct. 7, 2014

(54) METHOD AND APPARATUS PROVIDING COBOL DECIMAL TYPE ARITHMETIC FUNCTIONS WITH IMPROVED PERFORMANCE

(75) Inventors: Russell W. Guenthner, Glendale, AZ (US); Clinton B. Eckard, McMinnville, TN (US)

(73) Assignee: Bull HN Information Systems Inc., Chelmsford, MA (US)

( * ) Notice: Subject to any disclaimer, the term of this patent is extended or adjusted under 35 U.S.C. 154(b) by 1020 days.

(21) Appl. No.: 12/658,017

(22) Filed: Feb. 1, 2010

(65) Prior Publication Data

US 2011/0191755 A1 Aug. 4, 2011

(51) Int. Cl.
*G06F 9/44* (2006.01)
*G06F 9/45* (2006.01)

(52) U.S. Cl.
CPC .............. *G06F 8/49* (2013.01); *G06F 9/4425* (2013.01); *G06F 8/41* (2013.01); *G06F 8/4441* (2013.01)
USPC ............................ 717/140; 717/151; 717/152

(58) Field of Classification Search
CPC ........ G06F 8/4441; G06F 8/49; G06F 9/4425
USPC .......................................... 717/136, 140, 152
See application file for complete search history.

(56) References Cited

U.S. PATENT DOCUMENTS

| 4,445,177 | A | * | 4/1984 | Bratt et al. | 712/245 |
|---|---|---|---|---|---|
| H472 | H | * | 5/1988 | Peterson | 708/673 |
| 7,284,241 | B2 | * | 10/2007 | Heishi et al. | 717/152 |
| 2009/0100227 | A1 | * | 4/2009 | Hansen et al. | 711/119 |
| 2012/0311550 | A1 | * | 12/2012 | Kawahito | 717/151 |

FOREIGN PATENT DOCUMENTS

EP 0243212 A1 * 9/1987 ............ 717/140

* cited by examiner

*Primary Examiner* — Anna Deng
*Assistant Examiner* — Brahim Bourzik

(57) ABSTRACT

A method and apparatus is disclosed providing an improvement in performance for arithmetic computations by a computer system for calculations which include decimal numeric variables. The improvement in at least one embodiment includes use of a special compiler in cooperation with a special decimal numeric subroutine library. The compiler provides comparative alignment information based upon comparing alignments of a plurality of decimal variables. The decimal subroutine library can then provide improved performance at run time by utilizing the information compared by the compiler at compiler time rather than making those computations repeatedly at run time.

9 Claims, 7 Drawing Sheets

METHOD AND APPARATUS PROVIDING COBOL DECIMAL TYPE ARITHMETIC FUNCTIONS WITH IMPROVED PERFORMANCE

CROSS REFERENCE TO RELATED APPLICATIONS

None

STATEMENT REGARDING FEDERALLY SPONSORED RESEARCH OR DEVELOPMENT

None

THE NAMES OF PARTIES TO A JOINT RESEARCH AGREEMENT

None

INCORPORATION-BY-REFERENCE OF MATERIAL SUBMITTED ON A COMPACT DISC

None

BACKGROUND OF THE INVENTION

1. Field of the Invention

This invention is related to the fields of: COBOL Programming Language, Decimal Arithmetic, Decimal Numerics, and other closely related computer art.

2. Description of the Related Art

Computer programs (also software programs, or just programs) are instructions for a computer or computer system to perform a task. A computer system requires programs to function, typically executing the program's instructions with a central processor unit. A computer program has an executable form that the computer system uses directly to execute the instructions. The same program in its human-readable source code form, from which executable programs are derived (e.g., compiled), enables a programmer to describe a task for a computer to perform. Computer source code is typically written by professional computer programmers. Source code is typically written in a programming language that allows for a programmer to describe tasks or functions for a computer to perform in a form that is relatively independent of the particular computer on which the program is run. That is, computer programs are often written in a "high level" language with the description of the task called "source" or "source code". The source code which describes a task is typically processed by a "compiler" (compiled) and an "executable program" is produced which can be executed (run) on a specific type of computer. Different compilers, or different compiler options can be used to produce an executable program for different types of computers, computer systems, or computer systems with various operating systems. Source code is converted by a compiler into an executable program, (typically contained in a file called an executable program file or a "binary" file) and later "executed" on the computer system by one or more central processing units. Alternatively, computer programs may be executed with the aid of an interpreter, or may be embedded directly into hardware or firmware for a specific computing machine.

Computers may also be programmed at a lower level known as "assembly" or "machine" level programming. Assembly or machine level programming is typically utilized when performance is very important or when low level tasks must be performed which are not directly supported by a high level programming language. Assembly language programming typically describes programming at a level or in a language in which the central processor unit instructions and usage of the hardware registers of the central processor unit are described directly.

One of the more common high level programming languages for business related computer programs or applications is called "COBOL" COBOL is one of the oldest programming languages. Its name is an acronym for COmmon Business-Oriented Language, defining its primary domain in business, finance, and administrative systems for companies and governments. The COBOL language includes as one of its features the capability for representation of numbers stored in memory in base ten. That is, the value of a number can be described in COBOL to be represented in computer system memory as a series of decimal digits, with further description providing for storage or location of a decimal point, scale factors, exponents and/or other attributes. Decimal numbers from 0-9 require at least four binary bits of storage, with values 0-9 typically representing decimal numbers from 0-9 respectively, and with the remaining six possible values of a four bit number being utilized for other purposes such as to represent a sign or a decimal point. Decimal numbers may also be stored as a string of characters with a character being contained in a "byte" which can vary in size with typical byte size being 8-bits, 9-bits, 6-bits or other sizes as might be defined for a particular computer system. Two 4-bit decimal digits can be "packed" into a single 8-bit byte, or decimal digits can be stored one character per byte which is "unpacked". Decimal digits may also be represented as full textual characters such as ASCII characters, that is, the ASCII value for the character "0" would be recognized as a number with the value of a decimal zero, and an ASCII character "1" would be a decimal numeric one, and so on. There are many ways of coding text characters and decimal values well known in the art of computing or which could be defined by one skilled in the art of computer programming or computer hardware design.

In the field of business computing, the performance of a computer system in performing decimal arithmetic calculations is critical because decimal arithmetic calculations are typically repeated many, many times within a business application or business transaction. In business applications, decimal numbers are often described and stored as fixed point decimal numbers with a scale factor that allows for a given number of decimal digits after the decimal point, such as two or three or more. Performance in the processing of decimal numbers is important enough that some computer companies such as Honeywell Inc. have included hardware and machine instructions within the Central Processing Unit of some of their computers for directly processing decimal numbers, that is directly processing decimal numbers represented as "ASCII" strings rather than in a binary representation (such as two's complement). Central Processing Unit hardware instructions are provided to perform decimal numeric operations such as add, subtract, multiply, divide and comparison operations.

On other computer systems however, direct support for decimal arithmetic is not provided and decimal calculations are typically performed by decimal numeric subroutines, the decimal numeric subroutines typically contained in a library. Calls to the decimal numeric functions are generated by a compiler and included in the executable code.

Decimal numeric functions are then invoked during execution as either machine instructions or calls to the subroutine library in order to perform a needed decimal numeric computation.

Decimal arithmetic is also of interest in the emulation of computer hardware or computing machines such as hardware emulators, or virtual machines such as the well known Java Virtual machine.

The COBOL computer language supports description of decimal numbers in many ways such as, for example, floating point decimal, fixed point decimal, unsigned decimal, signed decimal, overpunched signed ASCII, leading sign, trailing sign and so on.

Typically, in the prior art, hardware instructions or decimal arithmetic subroutine libraries are provided with attribute "descriptors" which describe attributes to the hardware instructions or to the arithmetic subroutines of the manner in which a referenced operand is stored in memory, and these attributes are used in "fetching" the operands, performing the operation, and then in "storing" a result. In order to perform a decimal operation, typically, for each operand, a compiler is used to provide to the hardware or to the decimal subroutine library, a pointer to the decimal "string" and a description in some form of the attributes which describe how the decimal operand is represented within the memory. For example in order to perform the operation A=B+C three pointers and three attribute descriptors would be provided by the compiler, one for each of the three operands A, B, and C. The pointers describe where the decimal "string" is located in computer system memory, and the attributes describe how the contents of that memory for each operand are to be interpreted. The points and the attributes can be combined into a single machine word or series of characters and there are many ways of providing pointers and descriptors or attributes of data such as decimal data that have been devised, or could be devised by one skilled in the art of computer design or computer programming.

Performing a desired decimal operation such as an "add" (decimal numeric add) typically requires the executing unit (i.e. hardware or software or firmware) performing the operation to examine the attributes of the input operands, move or align the data into a form where an addition can be properly performed (for example, line up the decimal points), perform the operation such as addition (including compensation such as that necessary to allow for "carries" to propagate across all decimal digits) and then convert the answer into a form such that it can be properly stored as defined by the attributes of the output (or "result") operand, which in this example is the "A" operand.

The shifting, alignment, compensation for carries, reordering of bytes for such things as little-endian/big-endian compensation and other similar operations all take time, and require examining the data and further typically require comparing attributes, such as the scale factor, of the two input operands, and sometimes the output operand to complete the operation. This comparison of attributes takes time whether the operation is executed by hardware, software, in-line code, or processing within a subroutine library. Further, there is a need for performance increase in performing decimal operations since many business transactions, especially those related to financial matters, require calculations in decimal form.

Indeed, there are standards committees and groups that have studied methods of performing Decimal Arithmetic and the choice of formats for describing Decimal data such as the IEEE Subcommittee 754R which has proposed and revised the IEEE 754-1985 and IEEE 854-1987 Standards for decimal arithmetic. (IEEE is the Institute of Electrical and Electronic Engineers)

A programmer and/or compiler writer and/or machine designer is thus motivated to look for ways to improve performance of mathematical operations between decimal numeric operands, especially as provided in the COBOL high-level computer programming language. It would therefore be an advantage to provide a method, system and/or apparatus for carrying out the compilation and execution of a computer program utilizing decimal numeric variables and for improving the speed of calculations involving operations between two or more decimal numeric variables.

It seems useful to consider some of the points discussed above in greater detail using illustrative examples of decimal numeric variables that are typically those computer program variables represented numbers in memory stored in a manner relating to base 10 arithmetic. Decimal numeric representation of numbers and decimal arithmetic using decimal numerics are especially important in the industries of banking and finance where accuracy is important and where calculations using numbers represented in other bases such as base two may provide somewhat different answers than calculations done totally in base ten. These differences are often related to rounding, and also to truncation of lower precision digits when results cannot be represented in the allocated area of storage.

For example, the decimal number computation of determining:

IF (0.1 plus 0.2 plus 0.2 equals precisely 0.5)
is not directly possible using base two arithmetic because the representation of the decimal numbers in base two is not precise, although it is straight-forward using base ten arithmetic.

To illustrate, consider the number:
"0.1" (decimal), which is "0.0001100110010011 . . . " (base 2).

Note that the value of 1/10 (decimal) is a repeating fraction in binary which looks like: "0.0001100110011001100110011 00110011 . . . " which illustrates that 1/10 (decimal) cannot be stored precisely as a binary fraction.

Similarly, "0.2" (decimal) is "0.001100110011 . . . " (binary), and "0.5" (decimal) is "0.10000000000 . . . " (binary).

Now consider an example of adding 0.1 plus 0.2 plus 0.2 decimal, with those numbers represented as binary fractions with 0 binary places of precision.

| "0.000110011" + | (binary) |
|---|---|
| "0.001100110" + | (binary) |
| "0.001100110" = | (binary) |
| 0.011111111" | (binary) | which is "almost" "the value of "0.1000" (binary) or "0.5" (decimal), but not quite. So the "IF" comparison above would give a "false" comparison result when with total precision it really should give a "true" result, because 1/10 plus 2/10 plus 2/10 really is exactly "0.5" (decimal) or 5/10.

Tools for conversion of numbers from fixed point decimal representation to fixed point binary representation that can be used to address these peculiarities are readily available with one such tool being found on the World Wide Web at: "http://www.easysurf.cc/cnver17.htm".

It is well known that there are various formats and standards for the storage of decimal numbers in memory of a computer system. Variables may be defined as a string of decimal digits with each digit having a value from zero to nine in the same manner as people normally think of decimal numbers. The decimal numbers may include a scale factor which provides a description of where a decimal point occurs within the digits of the decimal number. An exponent might also be provided, with the exponent in base ten, base two, or other representation. The decimal number may also be signed, that is it may be a positive or negative number with the sign being stored as an extra "digit" or combined in some way with other digits to indicate a sign. Combining the sign with other digits is sometimes called "overpunched" sign representation, which is terminology going back to the days of punch cards for representing numbers and characters to a computer system.

These elements which describe precisely how a decimal number stored in memory is to be interpreted can be called "element alignment information". That is, in general, they describe how the number is stored in memory and the information is used to determine how one decimal number must be aligned with another decimal number in order to perform arithmetic operations such as addition or subtraction. They also describe where and/or how to determine the sign of the decimal number, and where to find the decimal point.

Performing a simple addition of two decimal numbers requires that the numbers be aligned. For example, in order to calculated 1.25 plus 1.555, the decimal points of the two numbers must be aligned such as indicated below:

```
    1.25~
+   1.555
=   2.755
```

In memory these numbers might be represented as strings of digits with scale factors:

(125*10^-2)+(1555*10^-3)=>2755*10^-3

Performing these calculations require that the number "125" be aligned properly with the number "1555" so as to correctly perform the addition computation. This alignment requires comparing the scale factor of the first number with the scale factor of the second number so as to calculate a shifting of one operand or the other so as to align the implied decimal points of the two operands and then perform the addition computation. In this example the first numbers scale factor of "−2" is compared to the second numbers scale factor of "−3" with a difference value of "1" and the first number is shifted to the left one decimal digit before it is added to the second number. In this manner the computation might look like this:

```
    1250   *10^-3    << <<<< (this number was shifted one to the left
+   1555   *10^-3              before the addition was performed)
=   2755   *10^-3    ... (which is 2.755)
```

It is noted for this discussion that the term "scale factor" and "exponent" are two distinct terms. "Scale factor" defines or describes an alignment or shifting of a number where the amount of the alignment or shift is expressed as a constant. For example a string of digits "1234" with a scale factor of two would be considered to have a value of 12.34, and "1357" with a scale factor of one would be valued as a decimal 135.7. In order to add these numbers "1234" and "1357" would be aligned as below:

```
      01234
+     13570
=     14804   which has a scale factor of two giving 148.04
```

The "constant" shift means that the numbers stored in memory always have the decimal point in the same place. This is in contrast to an "exponent" where the numbers have an implied decimal point, but also have an exponent value which is a multiplier that can move the exponent right or left. In scientific notation, the number "48.04" would be expressed as (1.4804*10^2) that is, with an exponent of two and the implied decimal point always one to the right of the first digit. The "scale factor" for a number is constant and is not necessarily stored in memory relating to the number. In contrast, an "exponent" can vary in value, and therefore must be stored "with" or in memory relating to the number in order to determine its overall value completely (that is, including the multiplication by the exponent value). Numbers with equivalent scale factors can be added without shifting or alignment without knowledge of the actual value of the scale factor. For example, 12.34 can be added to 15.0 with a result of 27.35 without knowledge of the actual location of the decimal point. That is, 1234 is added to 1501 with an answer of 2735 and stored in that fashion in memory with only the programmer or the compiler program actually "knowing" the actual location of the decimal point.

These arithmetic calculations on decimal numerics are often performed by an execution unit that can be implemented by hardware, software or firmware that is tuned or optimized for performing these functions, that is, for example, the numeric operations may be performed by routines optimized for the purpose which are external to a main computer program. Decimal numerics are often implemented/provided in function subroutines libraries, or by special hardware instructions that are typically multi-word instructions that provide pointers to the operand arguments and description of those arguments as to their characteristics such as scale factor, and/or manner of sign storage.

A typical list of arguments provided to these optimized "subroutines" (or other similar manner of implementation such as a complex hardware function) for performing an add of two decimal numbers (e.g. A, B) is as follows:

a) a pointer to the data A, which is a pointer to a first "string" of decimal digits;

b) a pointer to the data B, which is a pointer to a second "string" of decimal digits;

c) an indication as to "scale factor" of Operand A;

d) an indication as to "scale factor" of Operand B;

e) an indication as to where or how the sign of the number is stored for Operand A;

f) an indication as to where or how the sign of the number is stored for Operand B; and, g) similar information as to where/how to store the result of the addition.

When invoked, the library subroutine takes the scale factor of Operand A and compares it to the scale factor of Operand B, moves the digits of Operand A and Operand B into identical alignment and then performs the addition of the digits. The decimal addition may be performed multiple digits at a time, as in for example eight or sixteen digits within a 64-bit word that are added together, or the overall addition can be performed one digit at a time with carry propagation as required. Note that adding two decimal numbers which are represented as characters may require special addition of intermediate values to allow for carry propagation across the characters. This approach is well known in the art and is readily understood by one skilled in the art of arithmetic and digital systems logic design or computer programming.

Comparison of the scale factors may be needed even if the input operand data is not moved into a temporary storage location and also even if the digits are added one at a time because the fetching of the digits must provide in some way for alignment of the two numbers if the scale factors are different. The alignment requires preliminary computation steps in the comparison of the scale factors and may be followed by conditional processing steps dependent upon the results of the calculations. Alignment and computation of the result may also require consideration of the sign of the number. These processing steps take time and slow the performance in the computation of results.

The COBOL computer programming language provides for description (declaration) of decimal numerics in a plurality of memory storage formats. These formats include both fixed decimal and floating decimal point formats, in addition to declaration of binary (base two) integers. COBOL also provides for character strings which can be decimal numbers, as long as the digits of the character values are characters from "0" to "9". The language of COBOL specifically provides for description of decimal numerics in a manner easily understood by people in that the calculations are performed in a manner so that the results are identical to what would be done if a person were to calculate the results by hand, that is, a "pencil and paper" method. This means that calculations are made in base ten with a reasonable limit on precision, that is, the number of digits to the right of the decimal point. With the COBOL language numbers of this type can be declared with "PICTURE" (or "PIC") statements. Some typical declarations of variables in the COBOL language are as shown:

| MAX | PIC 99 VALUE 20 | <constant> |
| VAR4-1 | PIC S9999 | |
| SVAR4-2 | PIC S9(4) | |
| VALUE1 | PIC S9(7)V99 | <"Implied" decimal point> |
| VALUE2 | PIC S9(7)V99 | <"Implied" decimal point> |
| VALUEA | PIC S9(7) .99 | <"Real" decimal point> |
| VALUEB | PIC S9(7) .99 | <"Real" decimal point> |
| TOTALIT | PIC S9(12)V99 | <"Result variable> |

The COBOL programming language provides for both "REAL" and "IMPLIED" decimal points within the memory allocated for storing a decimal number. Most people tend to think of decimal numbers with a real decimal point included somewhere within the number and actually occupying a character position. That is "123.456" would be a seven character string in memory (without counting any "termination" character such as a null character, as in the "C" language). In COBOL however it is much more common and efficient to describe variables with an "IMPLIED" decimal point. That is, the compiler (and the programmer) knows where the decimal point is located, but the decimal point character is not actually stored in memory. "123.456" would be stored as "123456", a six character string in memory.

Typically decimal numeric calculations are performed during the execution (run time) of a COBOL program by an executing unit such as a library function, or by invoking a specific "subroutine" which passes a list of arguments to a common piece of code which performs the actual decimal numeric computation. An argument list typically provides, to the subroutine, a description of each or the plurality of input operand and where to store the output result. Within the argument list, each input operand is characterized independently of the others, and the characteristics of the memory locations to be utilized for storing the result are also provided independently.

BRIEF SUMMARY OF THE INVENTION

According to an illustrated embodiment of the present invention, an improved method and system for performing decimal numeric calculations is provided which requires fewer calculations, and fewer alignment and shifting operations in making decimal numeric calculations than in the prior art, especially in relationship to decimal numeric variables and operations implemented in the COBOL high-level programming language. This improvement is made by providing, to execution unit such as a library subroutine, an argument list which describes alignment comparison information instead of just "alignment" information. That is, the decimal numeric computation library subroutine is called with an argument list that includes "alignment information" that describes directly how to align the operands based upon comparison of the specified alignment of the operands rather than providing the specified alignment of the operands independently to the subroutine, and requiring the subroutine to perform the work of comparing alignments and determining how to align the operands.

For example, a specific decimal subroutine library of the prior art might have an argument list as follows:

```
DECIMAL-ADD-SUBROUTINE-PRIOR-ART (
    <Exemplary Argument list for Subroutine to add two decimal
  numbers>
        <Input Operands>
            Pointer to Operand 1;
            Length of Operand 1;
            Scale Factor of Operand 1;
            Pointer to Operand 2;
            Length of Operand 2;
            Scale Factor of Operand 2;
        <Output Operand>
            Pointer to Output Operand Storage;
            Length of Output Operand Storage;
            Scale Factor of Output Operand Storage;
    )
```

At run time the prior art subroutine "DECIMAL-ADD-SUBROUTINE-PRIOR-ART" would be invoked with an argument list and perform a decimal numeric addition by the following steps:

a) Compare Scale Factor of Operand 1 with Scale Factor of Operand 2;

b) Compare Length of Operand 1 and Operand 2;

c) Determine Alignment of Operand 1 and Operand 2 in order to properly perform an addition;

d) Properly pad Operands 1 and Operand 2 on left and right as needed for alignment, (if necessary).

e) Perform the addition and form a result string of characters, with carry properly handled;

f) Store the characters of the result string properly aligned based upon Length and Scale Factor of Output Operand Storage in comparison to length and scale factor of result string of characters; and, g) Store left and right pad characters if needed to fill all digits of output operand.

These steps are only a basic outline of processing needed, and could be done in parallel, with some steps skipped or combined, or with steps organized in a different order. These steps are only illustrative and are not intended to be a working example of the actual coding needed to perform such processing.

An improvement can be made in performance of the decimal arithmetic operation by providing for arguments to a decimal subroutine as illustrated below according to an illustrated embodiment of the present invention. Consider the following argument list for an improved decimal add subroutine:

```
<Exemplary Argument list for Improved Subroutine to add two decimal numbers>
    DECIMAL-ADD-SUBROUTINE-IMPROVED (
        <Input Operands>
            a. Pointer to Decimal Operand 1;
            b. Length of Decimal Operand 1;
            c. Starting Right Alignment Offset of Decimal Operand 1;
            d. Left Hand Zero Fill count for Decimal Operand 1;
            e. Pointer to Decimal Operand 2;
            f. Length of Decimal Operand 2;
            g. Starting Right Alignment Offset of Decimal Operand 2 ;
            h. Left Hand Zero Fill count for Decimal Operand 2;
        <Output Operand>
            i. Pointer to Output Operand Storage;
            j. Length of Output Operand Storage;
            k. Starting Right Alignment Offset for Decimal Output Operand;
            l. Left Hand Zero Fill count for Decimal Output Operand;
    )
```

This improved decimal execution subroutine provides for improved performance by including in the arguments "to" the subroutine, alignment information based upon comparison of two or more of the decimal operands. In the above list, each of the input arguments relating to decimal numeric input operands labeled "c", "d", "g", and "h", and input arguments relating to a decimal numeric output operand "k", and "l", are based upon comparison of the attributes (e.g. alignment and length) of two or more of the decimal operands referenced by arguments "a", "e", and "i". When this execution subroutine is called, during execution, the processing necessary to perform the required decimal numeric computation is reduced because the alignment computation operations have been previously performed by the compiler at compile time, rather than having to be repeatedly performed by the subroutine each time the subroutine is called at run time itself as in the case of the prior art.

The execution subroutine is typically used in conjunction with a specialized compiler. That is, according to the teachings of the present invention, the specialized compiler is used to process an input program such as a COBOL source program, with the source program including declaration of decimal numeric variables, and specification of arithmetic operations between those numeric variables. Input is provided to the compiler that provides with a complete description of the "variable type" as described in the source program, with variable type including characteristics (or attributes) such as memory storage space, alignment, storage type (such as packed or unpacked), length of the data, and scale factor. (This list is illustrative, and the variables may include either more or fewer attributes in actual practice). Given a specific arithmetic operation to be performed between two or more "input" operands so as to produce and store results into an output operand area, and a description of the variable type for each input operand, and the output operand, the compiler compares the variable type descriptions and generates in the compiled output, a call or invocation of a specialized decimal numeric subroutine which utilizes alignment comparison information provided by the compiler that is based upon comparison of the variable types, eliminating the need for performing a comparison or multiple comparisons at run time by mechanisms included within the subroutine itself. That is, calculation or computation operations necessary to complete the decimal arithmetic computation that depend upon alignment and comparison of the decimal variable types are done at compile time rather than at run time. This eliminates the need for these calculations to be done repeatedly at run time, each time the decimal numeric computation is performed and therefore is able to reduce the amount of the time spent in performing the decimal numeric computations during execution of the program (run time).

As an example, consider adding two decimal numeric operands that are each represented in memory as 10 decimal digits including two digits after the decimal to produce an 11 decimal digit result that also includes two digits after the operand. In the prior art, this decimal numeric operation would be performed by a call to a decimal numeric add subroutine with an argument list that provides description of the two input operands and their types, and the output operand and its type. The decimal numeric subroutine would examine the types of all operands, determine how to align the operands for addition, perform the alignment and any padding on the left and right of digits to make the two operands the same size, perform the addition, and then store the result, possibly with added digits of zeroes for padding on the left or right, or truncation of digits, all depending on the type of the output operand. With application of some aspects of the present invention, this simple addition can be performed with a call to a specialized subroutine that in large part does nothing except perform the addition and store the results since the input operands are already aligned, and the output operand is precisely the right size to hold the result of the addition (one extra digit on the left for a possible carry). Any code within the subroutine for doing alignment or padding would be given, by the compiler, values indicative of no alignment or padding necessary so that the code for doing this work at execution time is skipped entirely, and the actual addition computation is thus performed without delay. As a further improvement, storage of the results of the addition is also made directly into the memory space of the output operand variable, rather than storage into temporary or intermediate memory, with resultant savings in time.

In another embodiment of the present invention, results are calculated with less precision, in order to save time at run time, with the compiler influencing the precision utilized within the decimal numeric computation subroutine by determining precision needed at compile time rather than at run time. That is, an operation on two numbers with extended precision may not require computation with full precision if the result operand has length is less than required for full precision, or less than what might be utilized in temporary memory storage within the decimal numeric computation subroutine. As an example, consider dividing two operands with fixed precision of one decimal number before and five after the decimal point, with a result operand specified as having two digits before and one digit after, and with no rounding specified. In this case, for example, 1.00000 divided by 3.00000 could be performed with only three digits of precision calculated (two before the decimal point, one after) giving a result of "01.3" rather than calculating a result of "01.33333" and then throwing away the last four digits calculated.

As another example, adding "1.123456" to "1.1" giving a specified result with two digits before and one digit after the decimal point with no rounding, could be performed by calculating "01.1" plus "01.1" giving a result of "02.2" instead of considering all the digits of the first operand which would result in adding "01.123456" to "01.100000" giving an intermediate result of "02.223456" which would be truncated while moving the temporary result to the output memory storage location as "02.2".

The efficiency of performing decimal numeric calculations, especially adding and subtracting, are dependent, with some approaches, on the hardware representation of "characters" or "digits" in memory. The order of storage of characters within a word in many common computers has effect on the collection and alignment of data in the memory and in the Central Processor registers (sometimes called "accumulator" registers). The order of character storage within a word is often referred to for certain orders or patterns of storage as "Big Endian" or "Little Endian".

The interne web site "Wikipedia.org" at http://wikipedia.org/wiki/Endianess", describes "Endian" as follows:

"In computing, endianness is the ordering of individually addressable sub-units (words, bytes, or even bits) within a longer data word stored in external memory. The most typical cases are the ordering of bytes within a 16-, 32-, or 64-bit word, where endianness is often simply referred to as byte order. The usual contrast is between most versus least significant byte first, called big-endian and little-endian respectively. Mixed forms are also possible; the ordering of bytes within a 16-bit word may be different from the ordering of 16-bit words within a 32-bit word, for instance; although rare, such cases are sometimes collectively referred to as mixed-endian or middle-endian."

For a multiple character word size, characters with Big Endian character storage store the characters from left to right, that is from "big end" to "small end" (little end). For a machine with "Little Endian" storage, the characters are stored from little end, to big end. For 64-bit word with Big Endian storage, the decimal number "12345678" would be stored in a 64-bit word as "12345678". With this same string stored in a single 64-bit word, the characters might be ordered "78563412" (other orders may also be referred to as little endian depending on the overall size of a "word" within the computer system being considered.

A big endian machine allows for properly aligned characters to be directly added in two's complement form with appropriate correction for carry. A little endian machine may require moving the characters to an intermediate location individually so as to align them for a normal two's complement addition.

There are many variations on how decimal arithmetic is performed by various execution units implemented in software or hardware in current computing devices and by software subroutine libraries. Applying one or more principles of the present invention provides improvement in performance by providing description of the input and output operands to a decimal computation apparatus or software subroutine so as to eliminate need for one or more calculations at run-time which are dependent on comparison of the characteristics of one or more of the operands. Specifically in one illustrated embodiment, comparison of alignment, or alignment of decimal point, is made by a compiler and provided to the computation apparatus or subroutine, rather than making that computation or comparison at run-time. Additionally, the method and system of the present invention provides for the simplification of the software subroutines required to execute decimal arithmetic operations.

A person skilled in the art of programming and/or computer design would know or could develop many ways of applying the apparatus and/or method of the present invention so as to improve performance while performing decimal arithmetic, without departing from the principles of this invention in one or more embodiments.

BRIEF DESCRIPTION OF THE SEVERAL VIEWS OF THE DRAWINGS

The subject matter of the invention is particularly pointed out and distinctly claimed in the concluding portion of the specification. The invention, however, both as to organization and method of operation, may better be understood by reference to the following description taken in conjunction with the subjoined claims and the accompanying drawings in which:

DETAILED DESCRIPTION OF THE INVENTION

Figure 1:
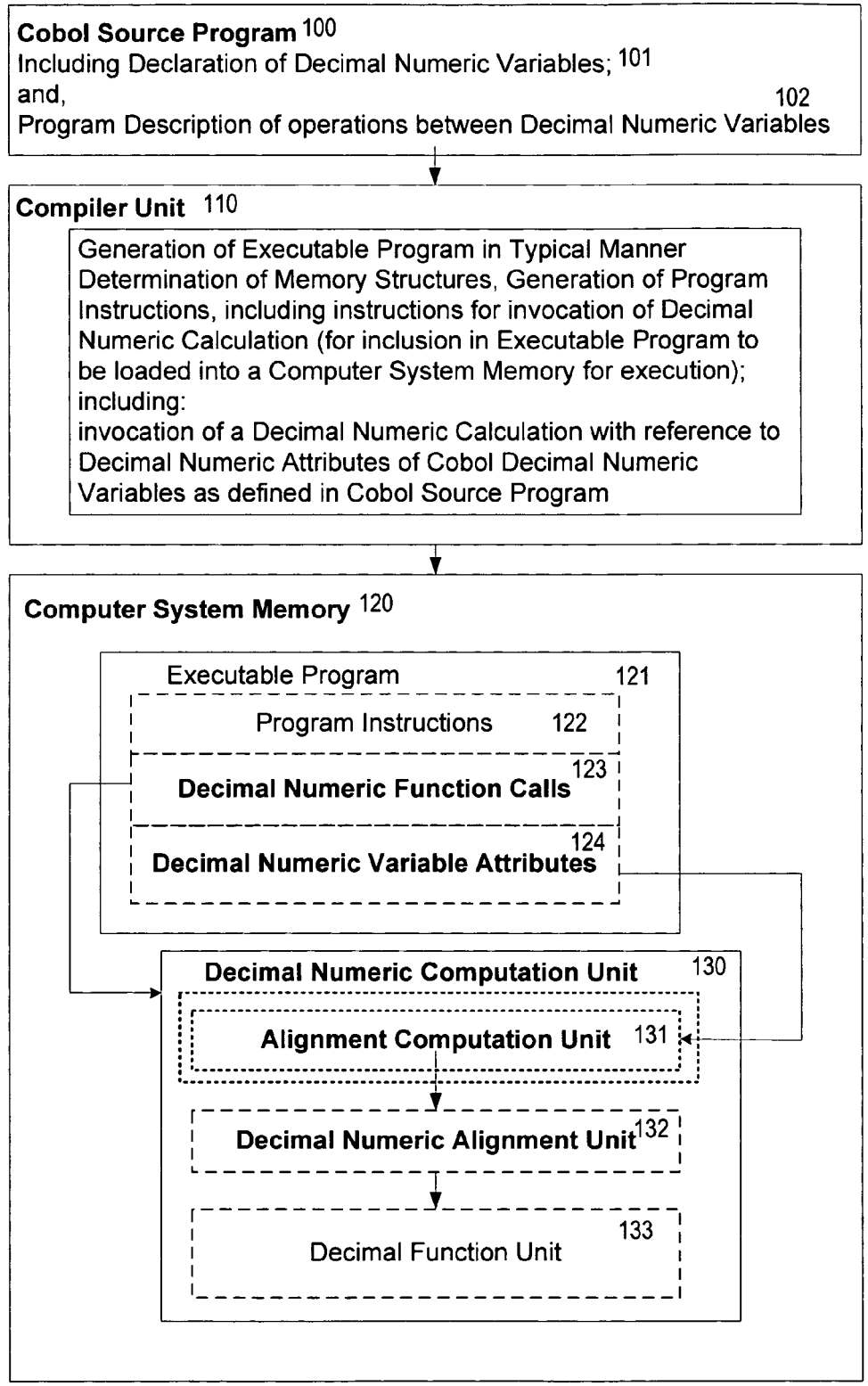
FIG. 1 illustrates a compiler unit typical of the prior art generating an executable program which calls decimal numeric subroutines which perform alignment calculations based upon attributes of decimal operands.

FIG. 1 illustrates a compiler unit 110 typical of the prior art which reads a source program 100 and generates an executable program 121 which is loaded into a computer system memory 120 and executed. The source program in this illustration is a COBOL Source Program 100 which includes declaration statements 101 describing Decimal Numeric Variables. The source program also includes program description of operations 102 between Decimal Numeric Variables. In a well known manner, the compiler examines the declarations and procedural code of the source program and generates an executable program 121 which includes instructions for performing the procedural code in the manner described in the program. Decimal Numeric operations are typically performed by invoking specific decimal numeric instructions if execution is intended on a hardware platform (Computer System) that provides those instructions, or, the decimal numeric operations may be performed by invoking calls to a library of decimal numeric subroutines which when called perform the requested calculations. The decimal numeric operands are typically stored in memory as strings of characters (packed or unpacked), and reference pointers are provided to either the hardware instruction or to the decimal numeric subroutine to locate both the input and output decimal operands.

In the illustration of FIG. 1, a Decimal Numeric Computation Unit 130 is shown, which can be implemented in hardware, hardware assisted by firmware, software, or in other ways that could be readily determined by one skilled in the art of computer hardware and/or software design. The Decimal Numeric Computation Unit is invoked, at execution time (run time) during execution of the program instructions 122 of the executable program 121. The program instructions include Decimal Numeric Instruction "calls" 123 which invoke or "call" the decimal numeric computation unit. The Decimal Numeric Computation Unit is supplied with pointers or description of the Decimal Numeric Variables (operands) and also description of the Decimal Numeric Variable Attributes 124, which provide description of how a decimal number is represented in memory (such as scale factor, or length of the variable). The "attributes" may include a pointer which provides reference to the memory, or the pointer and other attributes may be stored separately in memory. These details can be determined by one skilled in the art of computer hardware and/or software design.

The decimal numeric computation unit includes an Alignment Computation Unit 131 which examines the input operands with regards to attributes such as length and scale factor, and then determines the shifting necessary to properly align the input operands in order to perform the desired decimal numeric operation. A Decimal Numeric Alignment Unit 132 is then utilized to perform the actual alignment of the input operands (typically two operands) in order to perform the operation, such as an add, based upon the alignment values determined by the Alignment Computation unit 131. The actual operation on the input operands is then performed by a Decimal Function Unit 133 which typically would perform adds, subtracts, complements or other numeric operations. The Decimal Numeric Computation Unit might also be used repeatedly to perform multiplies or divides or other functions, in ways that could be determined by one skilled in the art of computer software and/or hardware design.

Figure 3:
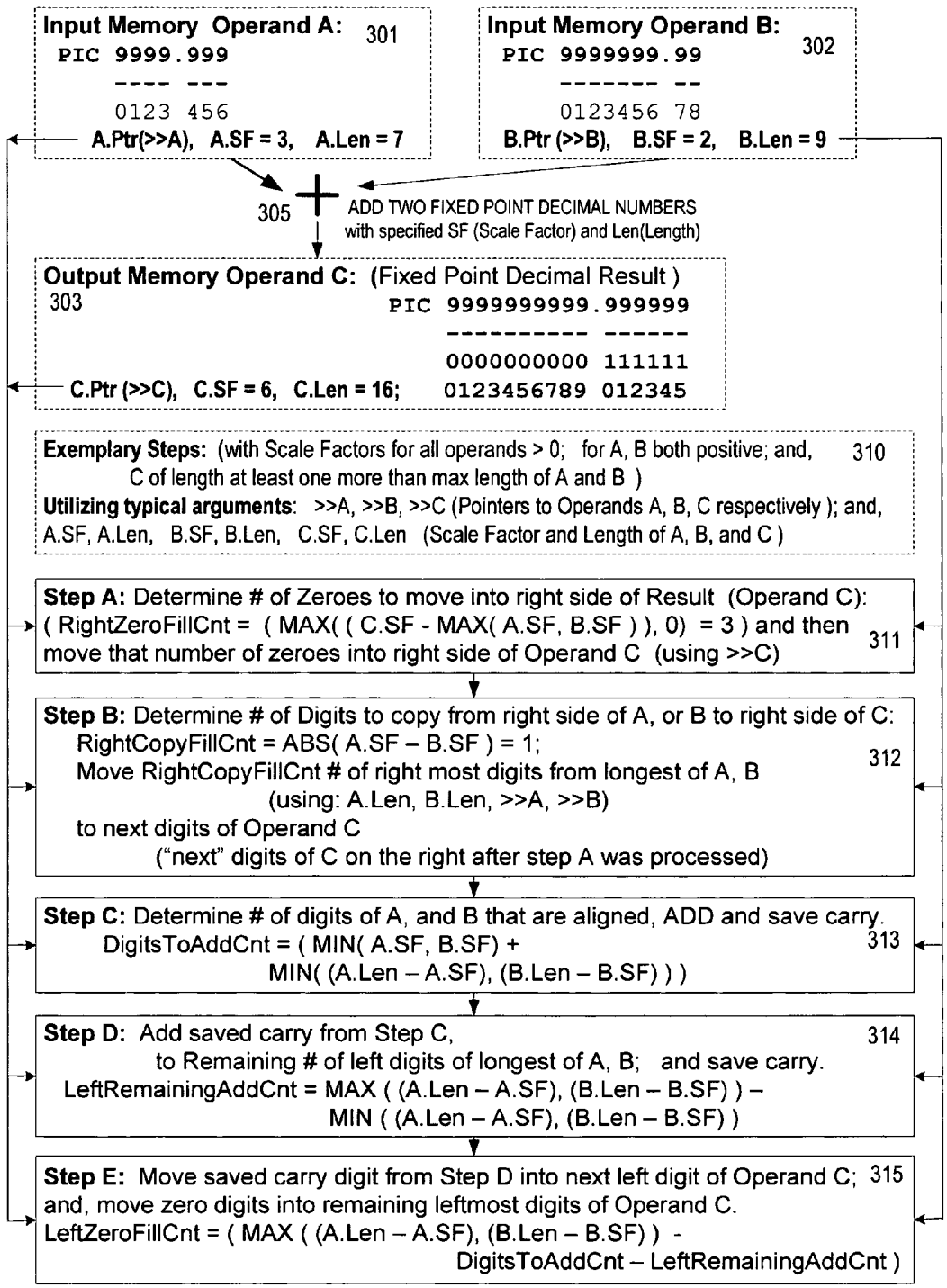
FIG. 3 illustrates typical steps as might be performed utilizing a method of the prior art for adding two decimal numeric numbers with specified attributes.

FIG. 3 provides illustration of typical steps 310 that would be involved in utilizing the prior art arrangement illustrated in FIG. 1 to perform a decimal numeric computation at run time (execution time). Two exemplary decimal numeric input operands "A", and "B" and an output operand "C" are illustrated in three boxes 301, 302, and 303 respectively. Within each box a COBOL declaration statement describing the "PIC" (picture) of how the operand is to be stored in memory is provided, and attributes determined by the compiler from analysis of the "PIC" statement illustrate the scale factor ("SF"), and length ("Len") of each of these three COBOL variables (or operands). Input Decimal Numeric Operands "A" and "B" are described within the COBOL source program as being "added" 305 together to form the output operand "C".

Exemplary steps 310 which include steps "A" through "E" with reference numbers 311, 312, 313, 314, and 315 respectively are shown and provide description of the typical logic processing performed by the Decimal Numeric Computation Unit 130 of FIG. 1. This unit 130 is used to perform a Decimal Numeric Add 305 as described in a COBOL Source program. Each step requires input of certain attributes of the input and output operands, that is, attributes describing separately each of the three Operands "A", "B", and "C". These individual attributes of each of the three operands are used by the Decimal Numeric Computation Unit to determine, at execution time, needed alignment and alignment related information such as "RightZeroFillCnt" in Step A 311, "RightCopyFillCnt" in Step B 312, "DigitsToAddCnt" in Step C 313, "LeftRemainingAddCnt" in Step D 314, and "LeftZeroFillCnt" in Step π 315. In these steps A through E in illustrated FIG. 3, rough equations are provided describing one possible approach to making calculations necessary for alignment. The "equations" are not intended to be precise and are only intended to illustrate the principle or method typically used in making such calculations. The "RightZeroFillCnt" (in Step A 311) illustrates the number of digits on the right of the decimal point of the output operand which extend to the right further than either of the input operands. The "RightCopyFillCnt" (in Step B 312) illustrates the number of digits on the right of the two input operands that is further to the right than the other input operand. These digits can be simply "moved" or copied to the output operand area without addition. "DigitsToAddCnt" (in Step C 313) are the digits of the input operands which actually overlap and which will be added. "LeftRemainingAddCnt" (in Step D 314) illustrates the number of digits that one input operand is extended to the left than the other, and is the number of digits of the longer input operand which must have a "carry" value added to ripple the carry across these digits. Finally, "LeftZeroFillCnt" (in Step E 315) illustrates the number of digits on the left that the length of the output operand exceeds either of the two input operands, subtracting one digit for the carry.

The above description is illustrative and imprecise in form. It assumes that there is adequate space within the output operand to hold all necessary digits, and also assumes that both input operands are positive, and have at least one or more digits of precision to the right of the decimal point. The illustration is meant to demonstrate that performing decimal addition typically requires the performance of several fairly complex alignment computation operations which are dependent upon the alignment relationship between the two input operands and the output operand. Performing these alignment computation operations at execution time (run time) and performing them repeatedly takes significant time.

Figure 2:
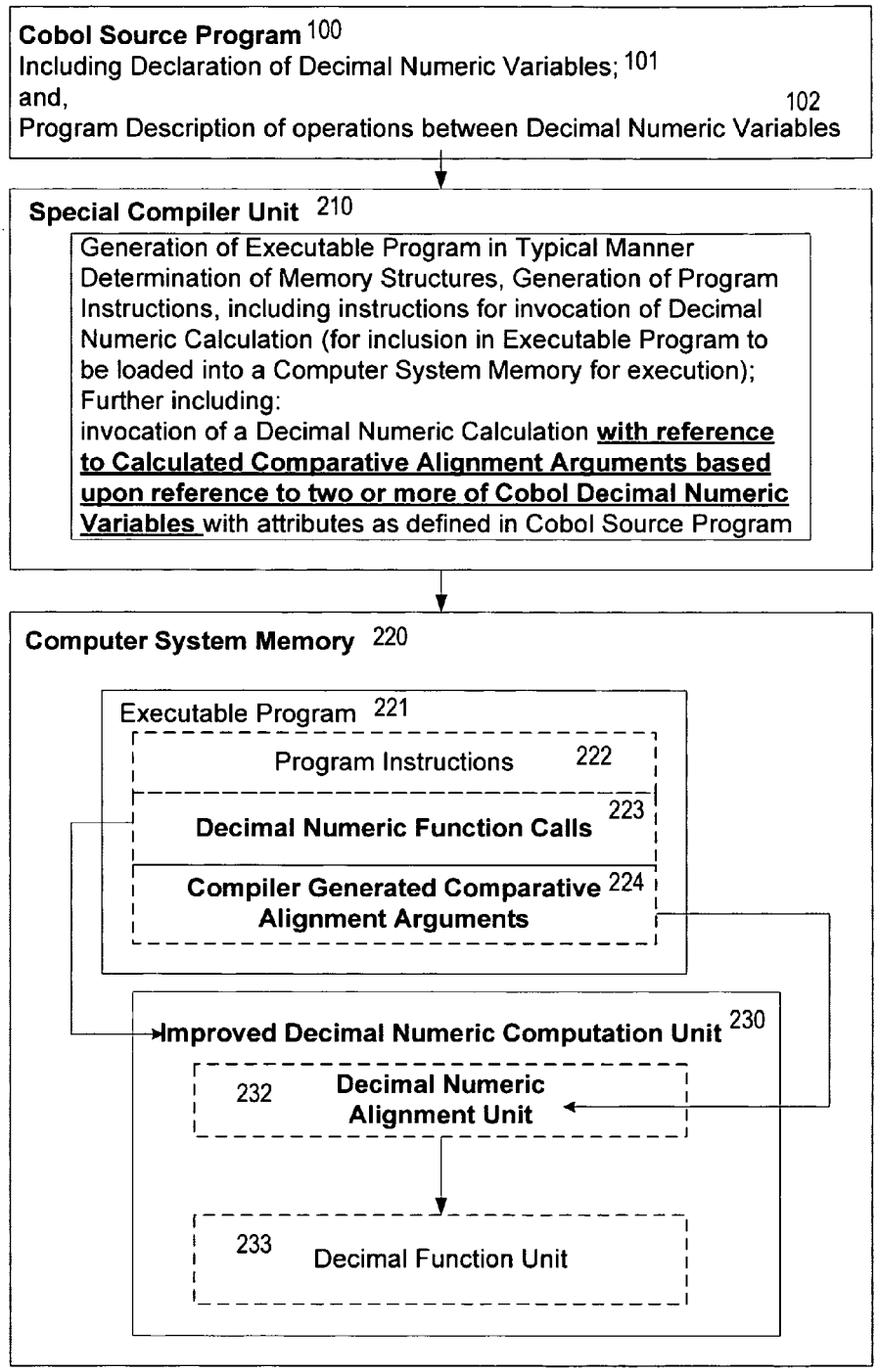
FIG. 2 illustrates a special compiler unit in the manner of one illustrated embodiment of the present invention in which the special compiler generates an executable program wherein the compiler performs alignment calculations based upon comparison of the attributes of decimal operands, and includes the results of those calculations within the executable program for later repeated use by decimal numeric subroutines.
Figure 4:
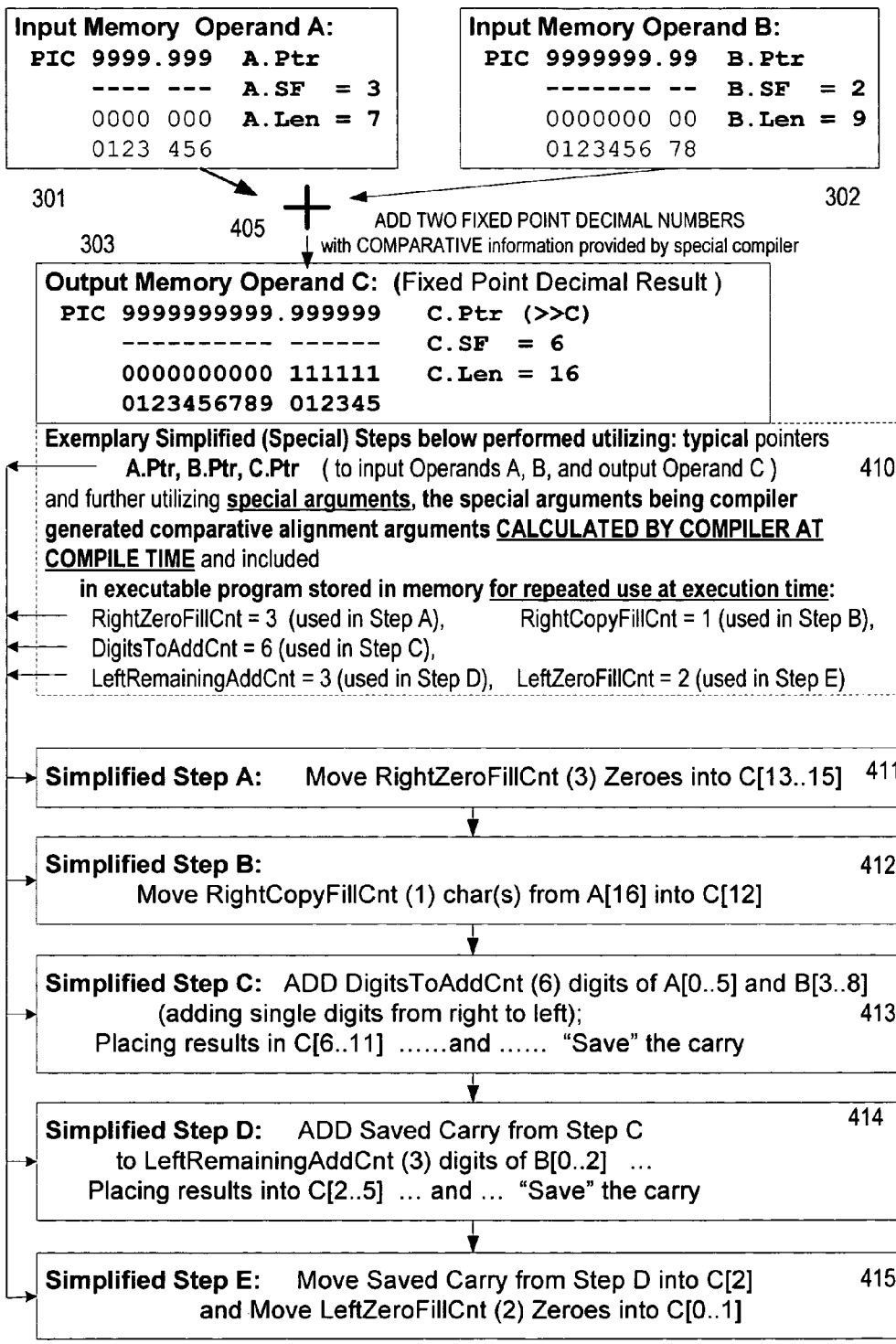
FIG. 4 illustrates steps in one illustrated embodiment of the present invention in which alignment calculations are made by the compiler and included within the executable program and then that information is utilized in steps as illustrated for performing a decimal arithmetic.

An improvement illustrative of one embodiment of the present invention, is provided in FIGS. 2 and 4. FIGS. 2 and 4 depict an exemplary improved method and/or improved apparatus for performing a Decimal Numeric Computation Operation according to an illustrated embodiment of the present invention. These FIGS. 2 and 4 illustrate an improvement wherein alignment computation operations based upon comparison of the attributes of the input and output operands are performed at compile time, in contrast to the prior art (FIGS. 1 and 3) in which those comparative computation operations were performed at execution time (typically repeatedly). In this manner, the actual alignment and decimal numeric operations are performed directly with reduced preparation time, and therefore enable improved performance.

FIG. 2 illustrates a COBOL Source Program 100, as in FIG. 1, which includes within the program source declaration of Decimal Numeric Variables 101 and program description 102 of operations (function) between these declared Decimal Numeric Variables. A Special Compiler Unit 102 takes the COBOL Source Program as input, typically from a file. The Special Compiler generates machine instructions, or other low level instructions to be included in an Executable Program file which is loaded into a computer system memory 220 as an Executable Program 221 that includes executable program instructions 222. The special compiler and the computer system on which the executable program is executed or run do not have to be the same computer system. The Special Compiler, in one aspect of an illustrated embodiment of the present invention, generates instructions and associated data which provides for "calling" or "invoking" via calls 223 to an Improved Decimal Numeric Computation Unit 230 to make or perform decimal numeric computation operations. Comparative Alignment Control Information 224, in one illustrated embodiment, is provided to the Improved Decimal Numeric Computation Unit 230 as arguments of a subroutine call, but could be conveyed in other ways. The Compiler Generated Comparative Alignment Arguments are utilized directly ("directly" meaning without further significant computation) by the Decimal Numeric Alignment Unit 232 to align the input decimal operands in order to perform the computation. For example, the Improved Decimal Numeric Computation Unit 230 could be implemented by a single hardware instruction, or series of instructions. The Improved Decimal Numeric Computation Unit could also be implemented with hardware structures controlled by firmware, or micro-code.

The alignment control information provided to the Improved Decimal Numeric Computation Unit differs from the prior art method of passing operand descriptors which are Decimal Numeric Variable attributes 124 of each operand in that the alignment information 224 is calculated at compile time by the compiler based upon comparison of the alignment of the operands. Further, the alignment control information is calculated and then provided in a form directly usable by the Alignment Computation Unit 131 of the Improved Decimal Numeric Computation Unit 230 to make direct alignment of the operands and then to perform an operation, such as a decimal numeric add, in the Decimal Function Unit 233.

FIG. 4 provides illustration, in the manner of at least one aspect of an illustrated embodiment of the present invention, that comprises five simplified (improved) steps 410 for performing the five related steps 210 (prior art) illustrated in FIG. 2. Simplified Steps "A" through "E" (411, 412, 413, 414, 415 respectively) do not require the performance of alignment computation operations illustrated in prior art FIG. 2 because the needed alignment information is calculated by the compiler at compile time, and contained in the executable program for use at execution time by the Improved Decimal Numeric Computation Unit. The "ADD" operation illustrated 405 in FIG. 4 achieves the same results as the "ADD" operation illustrated 305 in FIG. 3, but uses the comparative alignment information provided as arguments which enables better performance in carrying out the necessary computation operations.

Figure 5:
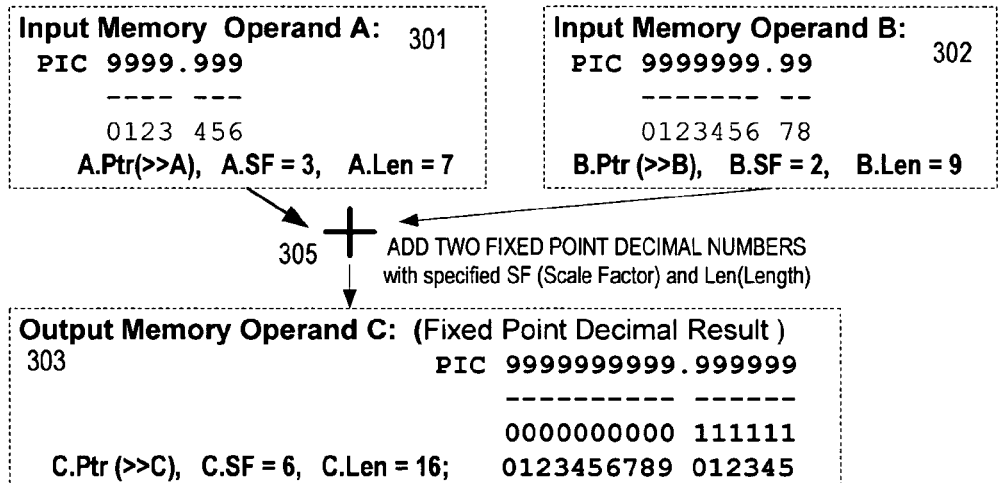
FIG. 5 illustrates a memory structure for calling a decimal numeric subroutine in a manner typical of the prior art.
Figure 5:
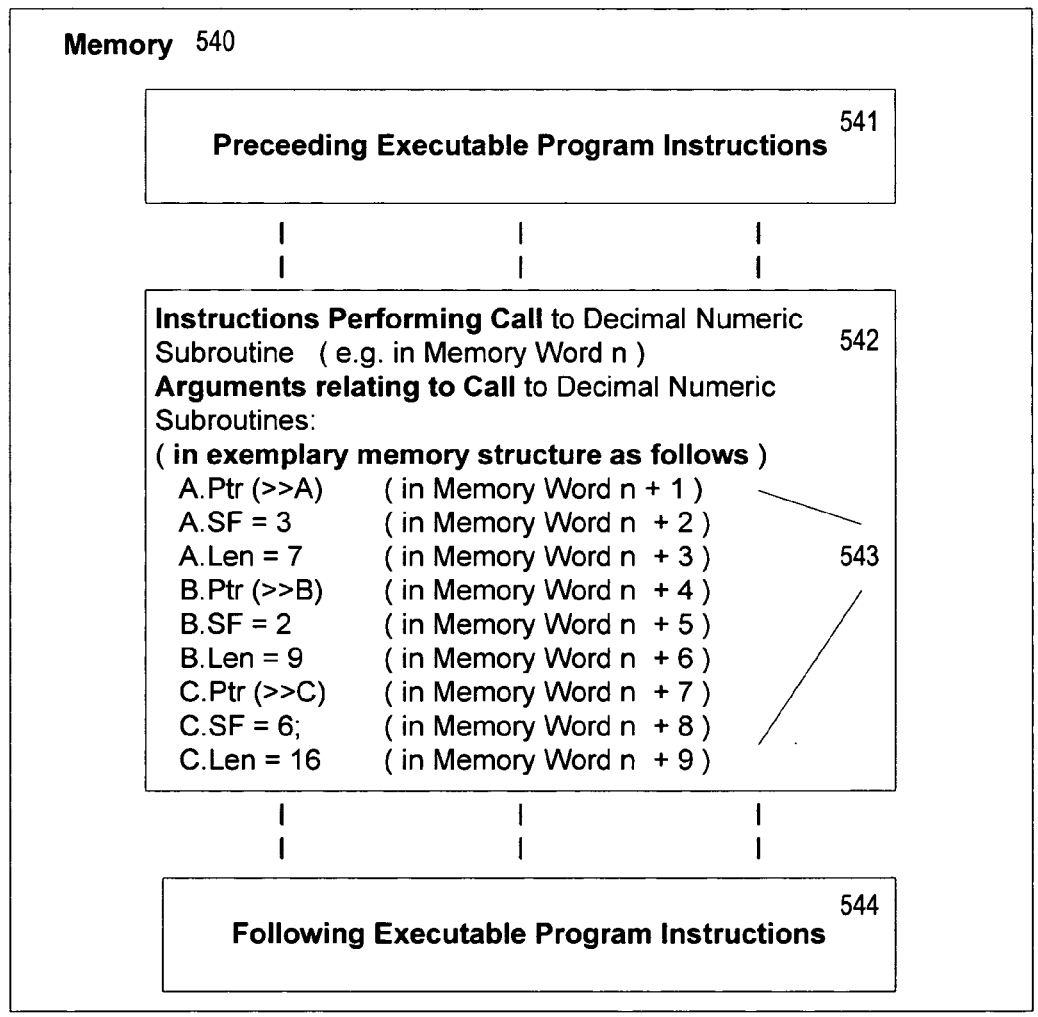

FIG. 5 provides illustration of a memory structure 540 typical of the prior art for calling via calls 542, and passing descriptions of the operands 543 to a Decimal Numeric Computation Unit 130. Calls to the Decimal Numeric Computation Unit are intermixed with preceding executable program instructions 541, and followed by executable program instructions 544.

Figure 6:
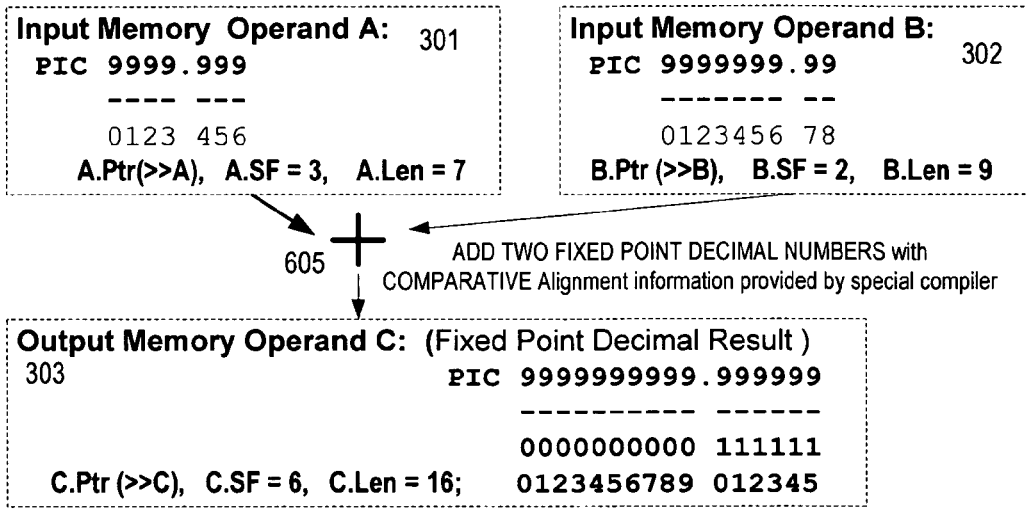
FIG. 6 illustrates a memory structure for calling a decimal numeric subroutine in which comparative alignment information is provided within a memory structure in a manner illustrative of one embodiment of the present invention; and, FIG. 7 illustrates providing the comparative alignment information in one illustrated embodiment of the present invention through attributes of the compiler generated name of the called decimal numeric subroutine.
Figure 6:
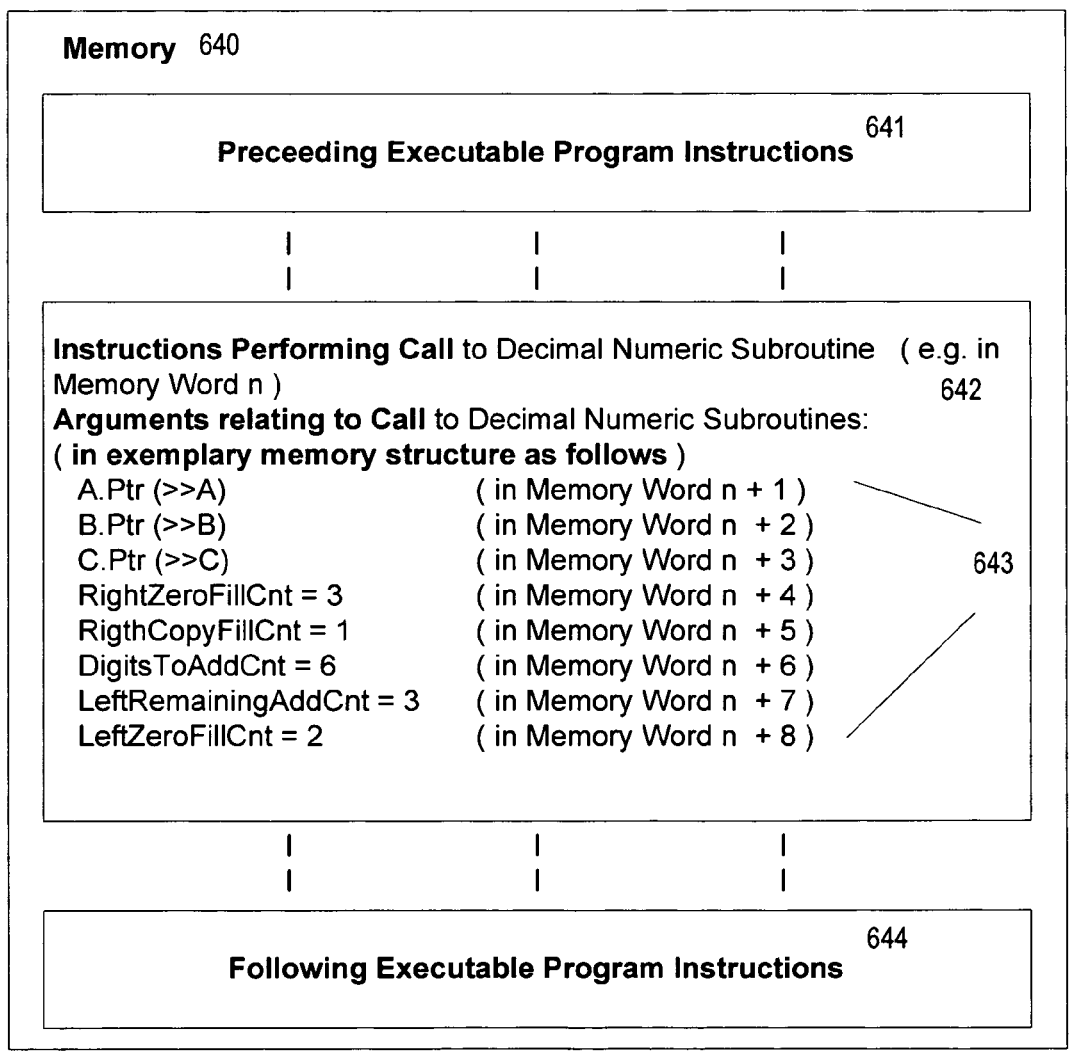

FIG. 6 provides illustration of a memory structure 640 illustrative of an improved memory structure which provides instructions for performing a Decimal Numeric Add 605 by calling via calls 642 an Improved Decimal Numeric Computation Unit 230 with arguments which include comparative alignment information 643. Calls to the Improved Decimal Numeric Computation Unit are also intermixed with preceding executable program instructions 641, and followed by executable program instructions 644.

Figure 7:
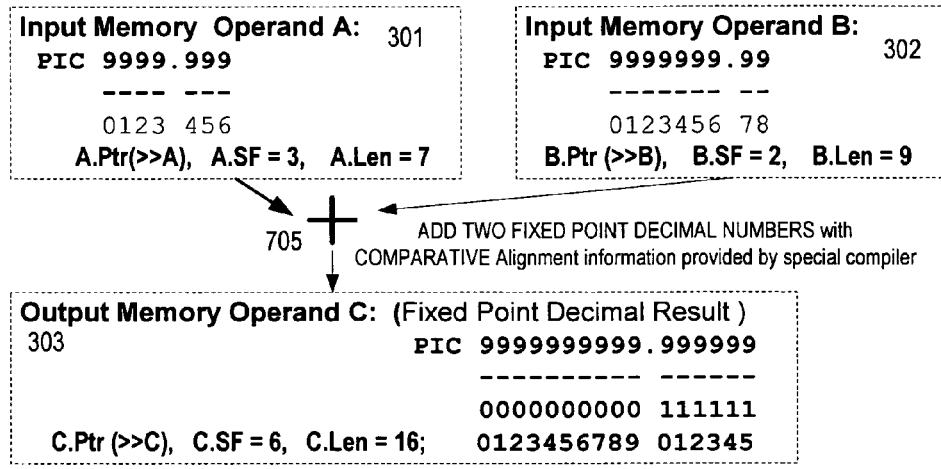
Figure 7:
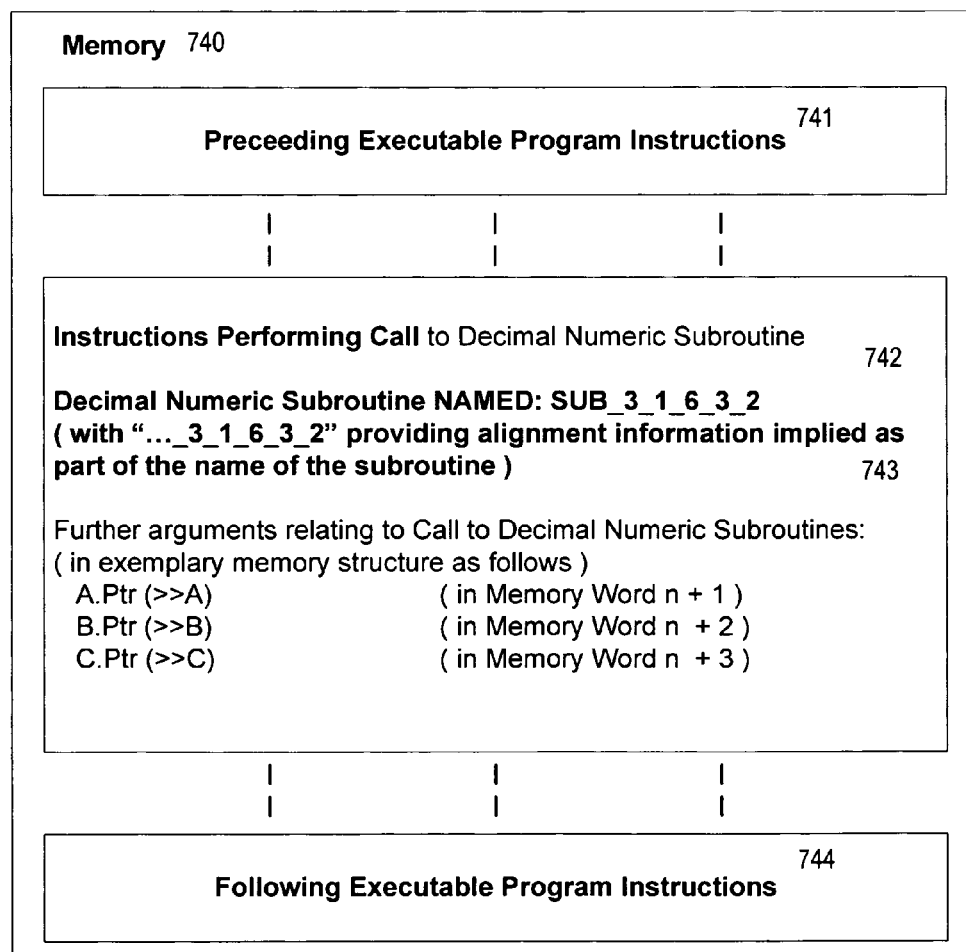

FIG. 7 provides illustration of a memory structure 740 illustrative of an improved memory structure constructed according to the teachings of the present invention. The memory structure 740 provides instructions for performing a Decimal Numeric Add 705 by calling via calls to 742 an Improved Decimal Numeric Computation Unit including comparative alignment information 743. Calls to the Improved Decimal Numeric Computation Unit are intermixed with preceding executable program instructions 741, and followed by executable program instructions 744. In this illustration (FIG. 7) alignment information is provided to the Improved Decimal Numeric Computation Unit by the "name" 743 designating the Improved Decimal Numeric Computation Unit being called. That is, alignment information is communicated to the Improved Decimal Numeric Computation Units using the name of the subroutine called. This approach may be provided by implementing multiple entry points into a subroutine, or by implementing multiple routines which perform alignment which is dependent on the name of the subroutine being called.

Thus, while the principles of the invention have now been made clear and described relative to a number of illustrative embodiments or implementations, it will be immediately obvious to those skilled in the art the many modifications or adaptations which can be made without departing from those principles. While the invention has been shown and described with reference to specific illustrated embodiments, it should be understood by those skilled in the art that various changes in form and detail may be made without departing from the spirit and scope of the invention as defined by the following claims.

Having described the preferred embodiments of the invention, it will now become apparent to one skilled in the arts that other embodiments or implementations incorporating the teachings of the present invention may be used. Accordingly, these embodiments should not be limited to the disclosed embodiments or implementations but rather should be limited only by the spirit and scope of the following claims.

What is claimed is:

1. A method of generating an executable computer program, the executable computer program including instructions for invoking decimal numeric computations during its execution on a computer system, the executable computer program generated by compilation of a computer program source file;

the source file including:
a) declarations of decimal numeric variables specifying declared attributes of each decimal numeric variable and,
b) description of decimal arithmetic operations between first and second of the decimal numeric variables; the method comprising the steps of:
A) reading, with a special compiler, the computer program source file;
B) generating, by the special compiler, the executable computer program including executable instructions which perform a plurality of calls to a special decimal numeric subroutine stored in a memory associated with the computer system for performing decimal arithmetic operations; and
C) storing within the executable computer program, an argument for each of the plurality of the calls to the special decimal numeric subroutine, each of the argument lists containing at least one argument that directly provides compiler generated comparative alignment information, the comparative alignment information determined by the special compiler at compile time based upon a comparison of the declared attributes of the first and second decimal numeric variables, for enabling the special decimal numeric subroutine to perform a decimal numeric operation upon the first and second decimal numeric variables utilizing said comparative alignment information to directly align at run time, the first decimal numeric variable with the second decimal variable for reducing time spent in performing the decimal numeric computations during execution of the executable program;

wherein the compiler generated comparative alignment information is based upon a comparison of lengths of the first and second decimal numeric variables the comparative alignment information determined during compile time.

2. The method of claim 1 further comprising a step D) which is: binding or linking with the executable computer program, the special decimal numeric subroutine.

3. The method of claim 1 wherein the compiler generated comparative alignment information is based upon a comparison of scale factors of the first and second decimal numeric variables and determined during compile time.

4. The method of claim 1 wherein the compiler generated comparative alignment information is based upon a comparison of memory storage formats of the first and second decimal numeric variables determined during compile time.

5. The method of claim 1 further including the step of executing the executable computer program on the computer system in which the executing includes processing of the executable instructions that invoke one of the calls to the special decimal numeric subroutine and then utilizes within the subroutine at least one item in the argument list which provides a reference to the comparative alignment information.

6. A Non-transitory computer readable medium storing instructions when executed generate an executable computer program for performing decimal numeric operations on a computer system, the executable computer program generated by compilation of a computer program source file;

the source program file including:
a) declarations of decimal numeric variables specifying declared attributes of each decimal numeric variable; and
b) description of decimal arithmetic operations between two or more of the decimal numeric variables;
the method comprising the steps of:
A) reading, with a special compiler, the computer program source file;
B) generating, by the special compiler, the executable computer program including executable instructions which perform a plurality of calls to specifically named decimal numeric subroutines stored in a memory associated with the computer system for performing decimal arithmetic; and
C) storing within the executable program, calls with special compiler generated calling names to one or more of the specifically named decimal numeric subroutines, the calling names in themselves providing alignment information computed by the special compiler at compile time based upon a comparison of the declared attributes of two or more of the decimal numeric variables, the special compiler generated comparative alignment information being directly utilizable by the special named decimal numeric subroutines to perform at execution time, a decimal numeric operation which operates on the decimal numeric variables utilizing said special compiler generated comparative alignment information for directly aligning the two or more of the decimal numeric variables;

wherein the special compiler generated calling names are based upon comparison of lengths of the two or more of the decimal numeric variables during compile time.

7. The computer readable medium of claim 6 wherein the special compiler generated calling names are based upon comparison of scale factor of the two or more of the decimal numeric variables during compile time.

8. The computer readable medium of claim 6 wherein the special compiler generated calling names are based upon comparison of memory formats of the two or more of the decimal numeric variables during compile time.

9. A computer system apparatus for performing decimal arithmetic calculations on decimal numeric operands stored within a memory of the computer system, the computer system apparatus comprising:
A) a processor and memory;
B) a decimal arithmetic computation invocation mechanism for initiating a specified decimal arithmetic computation operation, the initiation including reference to an argument list;
C) a memory interface apparatus operatively connected and controlled by the computer system for obtaining directly from the memory, in response to the decimal arithmetic computation invocation mechanism, the input argument list comprising:
a) operand reference pointers providing reference to the decimal numeric operands in the memory of the computer system, and
b) a plurality of compiler generated comparative alignment element values, each comparative alignment element value being based upon a comparison of at least two declared attributes of the decimal numeric operands the comparative alignment element values determined during compile time and directly providing comparative alignment information for use in aligning two of the decimal numeric operands during run time,
the operand reference pointers including a) first and second input operand reference pointers providing reference to locations in the memory of first and second decimal numeric input operands, and, b) a result operand reference pointer providing reference to a location in memory for storage of a decimal numeric result;
D) an input operand access unit operatively coupled to the memory, the access unit, utilizing the first and second input operand reference pointers specified in the input argument list to obtain the first and second decimal numeric input operands from the memory of the computer system;
E) an input operand alignment unit utilizing directly, the compiler generated comparative alignment element values to align the first and second decimal numeric input operands properly for performing the specified decimal arithmetic computation operation and providing aligned decimal numeric input values;
F) a decimal numeric function unit utilizing the aligned decimal numeric input values and performing the specified decimal arithmetic computation on the first and second decimal numeric input operands and forming the decimal numeric result; and
G) a storing unit being coupled to the decimal numeric function unit and operative in further response to the decimal arithmetic computation invocation mechanism, to store the decimal numeric result into the memory of the computer system at the location in memory referenced by the result operand reference pointer specified in the input argument list.

* * * * *